US006948878B1

(12) United States Patent
Smith, Jr. et al.

(10) Patent No.: US 6,948,878 B1
(45) Date of Patent: Sep. 27, 2005

(54) LOCKING QUICK RELEASE DEVICE

(75) Inventors: Robert J. Smith, Jr., Dubuque, IA (US); Richard L. Smith, Dubuque, IA (US)

(73) Assignee: Grove Tools, Inc., Dubuque, IA (US)

( * ) Notice: Subject to any disclaimer, the term of this patent is extended or adjusted under 35 U.S.C. 154(b) by 0 days.

(21) Appl. No.: 10/606,479

(22) Filed: Jun. 26, 2003

(51) Int. Cl.[7] .......................... B25G 3/00; F16B 7/08

(52) U.S. Cl. ...................... 403/110; 403/234; 403/235; 403/237; 403/290; 403/321; 403/322.1; 403/322.4; 403/373; 403/374.5; 403/DIG. 4; 403/DIG. 9; 70/233; 70/261

(58) Field of Search ........................ 403/110, 234, 235, 403/237, 290, 321, 322.1, 322.4, 373, 374.5, 403/DIG. 4, DIG. 9, 109.1–109.8; 70/233, 70/261

(56) References Cited

U.S. PATENT DOCUMENTS

| | | | | |
|---|---|---|---|---|
| 4,028,915 | A | 6/1977 | Stahl | |
| 4,114,409 | A | 9/1978 | Scire | |
| 4,621,873 | A | 11/1986 | Weinstein et al. | |
| 5,007,260 | A | 4/1991 | Sharp | |
| 5,291,763 | A | 3/1994 | Cuisinot | |
| 5,479,836 | A * | 1/1996 | Chang | 70/233 |
| 5,511,894 | A * | 4/1996 | Ng | 403/320 |
| 6,601,712 | B2 * | 8/2003 | Dean et al. | 403/320 |
| 2002/0026816 | A1 * | 3/2002 | Katsouros et al. | 70/233 |

* cited by examiner

*Primary Examiner*—Daniel P. Stodola
*Assistant Examiner*—Victor MacArthur
(74) *Attorney, Agent, or Firm*—Ryan N. Carter

(57) ABSTRACT

The device of the present invention is a locking quick release device for allowing quick and easy release and adjustment to a bicycle seat and/or bicycle wheels, while still allowing the seat and/or wheels to lock to the bike frame when the quick release lever is in the closed position. The device includes a standard plug lock combined with the lever of the quick release device. In the closed position, the lock can be engaged with a key, securely locking the lever closed and the seat and/or the wheels to the bicycle frame.

5 Claims, 6 Drawing Sheets

LOCKING QUICK RELEASE DEVICE

BACKGROUND OF THE INVENTION

The present invention relates to locks for quick release mechanisms. More particularly, the invention relates to a lock that attaches to the lever assembly of quick release mechanisms for bicycle seat posts, bicycle wheels, and bicycle carriers.

Bicycles are provided with quick release mechanisms for the seat post and wheels which allow for the quick and easy removal and adjustment without the use of tools. Frequently, these components are removed during transport of the bicycles. A conventional type of quick release includes a hand-operated lever which controls a cam shaft for releasing and securing the seat to the frame, or the wheels to the fork of the bicycle.

These lever-actuated quick release systems ease the chore of adjusting and removing the wheels and seats from the bicycle; however, they also ease the task of the thief in removing the seat or wheels. As a consequence, to prevent theft, it has become rather ordinary for the bicyclist to remove the wheel and the seat, usually the front wheel, and then lock the front and back wheels with the bicycle to some permanently fixed post or the like. The seat, which is difficult to lock with the wheels, is generally carried with the bicyclist. Upon return the bicyclist must then reassemble his or her bicycle before proceeding. This practice is extremely inconvenient for the rider.

Several prior art locking devices exist for quick release mechanisms. One such combination locking device and quick release mechanism is described in U.S. Pat. No. 5,291,763. In this device, the lock includes a conventional key operated plug lock mounted within a lock adaptor which in turn is rotatably mounted upon a lever housing. The lever housing includes an aperture for attachment of the conventional lever bore at the end of the shaft of the quick release mechanism. A camming mechanism with stop points is used to control rotation of the lock adaptor on the lever housing. In the locked position, the lever housing blocks movement of the lever arm. One problem with this design is that the lever can still be moved a short distance before it is stopped by the lever housing. The lock adapter also adds weight to the bicycle which is undesirable for most riders.

Another such combination locking device and quick release mechanism is described in U.S. Pat. No. 4,028,915. The device includes a lockable housing and cover which prevents operation of the lever. The housing and cover must be removed from the device to operate the lever. One problem with this design is that the housing may be lost when removed.

One other prior art quick release mechanism and integral lock is described in U.S. Pat. No. 4,621,873 to Weinstein et al. The device includes a conventional lock and a spring operated pin. In the locked position, the pin is engaged within a hole formed in the lever arm to prevent operation of the lever. The problem with this device is that the lever needs to be in precisely the right position for the pin to become engaged with the hole in the lever arm. This alignment may be difficult to achieve.

Therefore there is a need in the art for a locking quick release device that does not allow the lever to move any distance in the locked position, that does not require removal to operate the quick release mechanism, and that is small and light weight to enable the rider to leave the lock on the quick release while riding the bicycle.

An object of this invention is to completely deter the casual thief from stealing and greatly deter a professional thief from stealing bicycle seats and wheels.

Another object of this invention is to provide a lock for the mechanism that allows quick and easy release and adjustment to a bicycle seat and/or bicycle wheels without using any tools.

Another object of the present invention is to provide a small, simple, inexpensive and light weight universal lock for a quick release mechanism.

Yet another object of this invention is to allow the lock to be universal in that it can be keyed the same as other locks used by the rider, so that the rider only has to have one key for all his/her cycling related locks.

SUMMARY OF THE INVENTION

The present invention is a locking quick release device for allowing quick and easy release and adjustment to a removable bicycle component, such as a bicycle seat or bicycle wheels, while still allowing the removable component to lock to the bicycle frame to deter theft. Quick release devices on bicycles are known in the industry. They employ a lever that can be released without the use of tools for the quick and easy adjustment of the height of a bicycle seat or release of the bicycle wheels. The lever controls how tightly two bifurcated ends hold the removable component to the bicycle frame. The present invention combines a standard accessories plug lock with the lever of the quick release mechanism. When the lever of the quick release device is moved from the open to the closed position, the bifurcated ends become tightly clamped around the removable component. When the lever is in the closed position, the locking plate of the lock is inserted into the nose of the device and can be engaged with a key. Engagement of the locking plate moves it rotationally inside of the nose so that its exit is blocked, thereby locking the lever in the closed position. Locked in the closed position, the bicycle seat cannot be raised, lowered, or removed from the frame of the bicycle. If the user wants to adjust the height or remove the component from the frame, the key is inserted into the lock on the quick release lever which turns the locking plate inside the nose, releasing the lever from the closed position. The lever can then be opened, which pushes the bifurcated ends farther apart, and allows the removable component to be able to be adjusted or removed from the bicycle frame.

DESCRIPTION OF THE PREFERRED EMBODIMENT OF THE INVENTION

Figure 1:
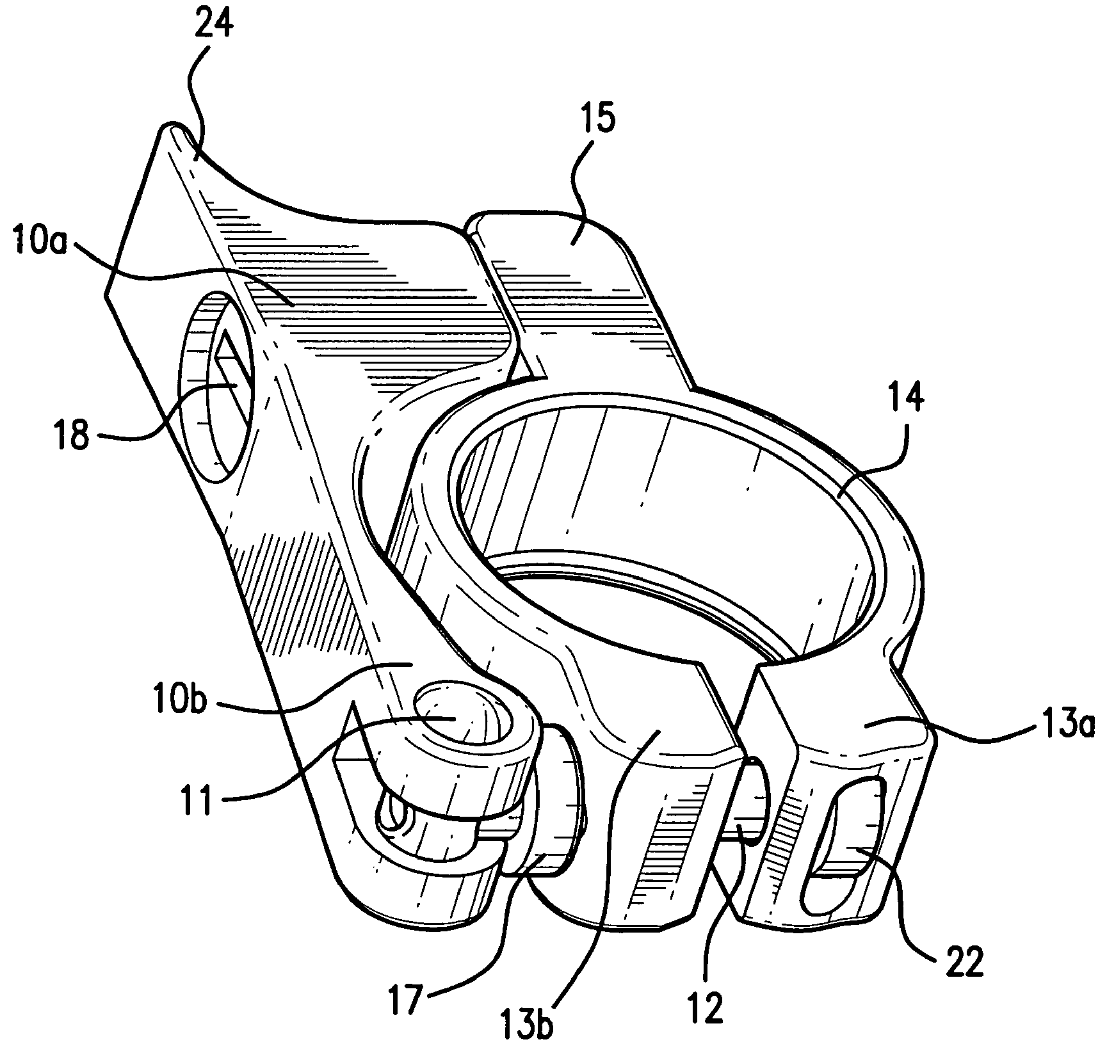
FIG. 1 is a perspective view of the quick release seat lock in the closed or locked position.
Figure 2:
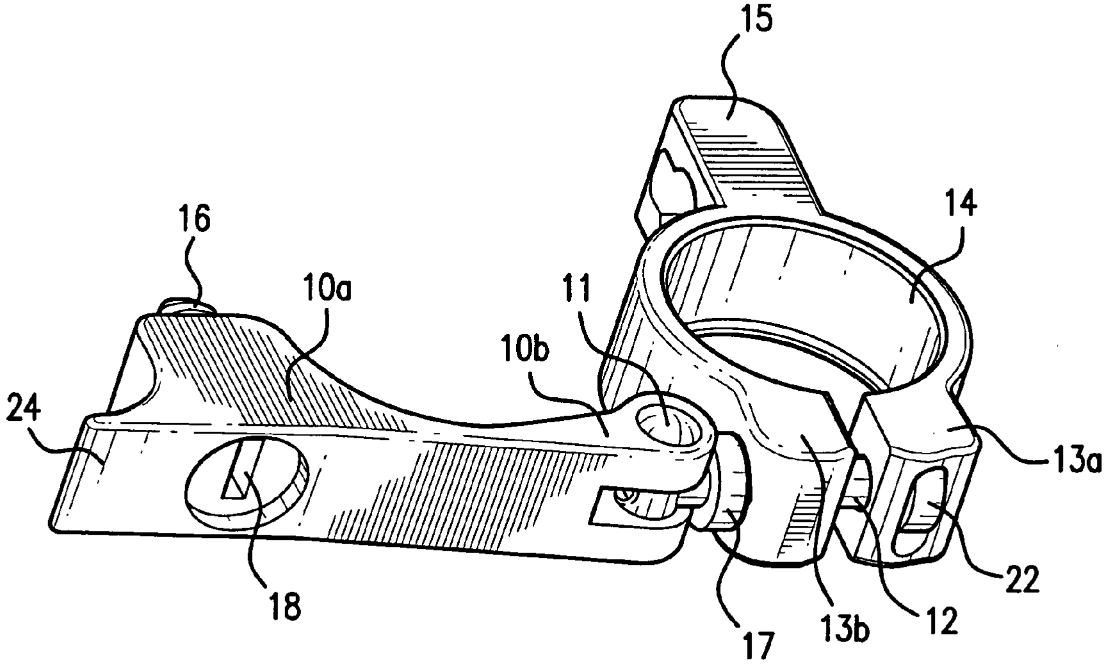
FIG. 2 is a perspective view of the quick release seat lock in the open or unlocked position.
Figure 3:
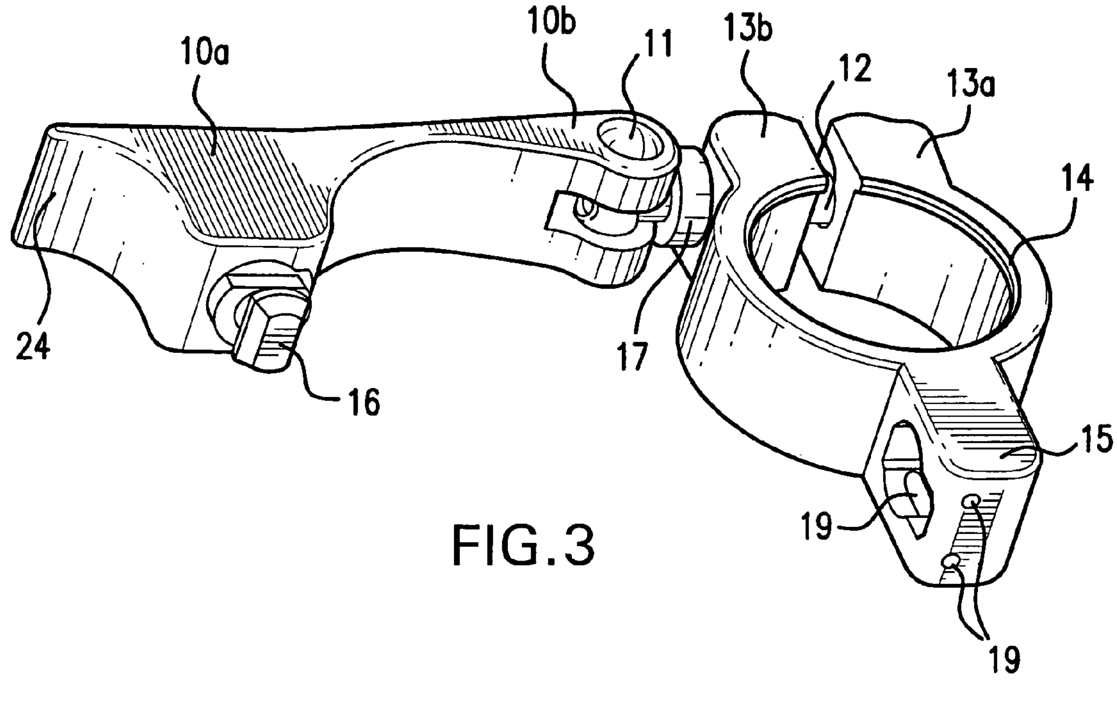
FIG. 3 is a perspective view of the quick release seat lock in the open or unlocked position.

Referring now to the several figures of the drawings wherein like reference characters designate like parts throughout the several views, FIGS. 1 and 2 show the locking quick release device in the closed (locked) and open (unlocked) positions, respectively. The present invention is a locking quick release device for allowing quick and easy release and adjustment of a removable component such as a bicycle seat assembly 40 or bicycle wheels, while still allowing the removable component to lock to a fixed component such as the bicycle frame 42 to deter theft. In the open position, the locking quick release device operates similarly to quick release devices known in the industry. First and second members 13*a*, 13*b* (hereinafter referred to as bifurcated ends 13*a*, 13*b*) of the collar 14 include an axially aligned bore that receives a threaded member such as a bolt 12. Bifurcated end 13*a* (distal end) is combined with the bolt 12 as described below. A lever 10 is pivotally mounted on a pin 11 that extends transversely through the bolt 12. The lever 10 comprises a handle portion end 10*a* and a pivot portion end 10*b*. In the preferred embodiment, as shown in FIG. 3, the lever handle portion end 10*a* comprises either a lip on its top and bottom portion, or a thin extension 24 along the length of the lever 10 beyond the locking mechanism. This lip or thin extension 24 aids the user in gripping and applying leverage to the lever 10 when it is moved to the open or closed position. The lever 10 provides a cam surface that engages the wear plate 17 as the lever 10 is moved to a closed position. The wear plate 17 functions as a washer. It protects bifurcated end 13*b* from the pressure applied by the lever 10. The wear plate 17 also fills space so that the cam surface of the lever 10 does not have to travel as far to apply pressure to the bifurcated end 13*b* as the lever 10 is being closed. The cam surface on the pivot portion end 10*b* of the lever 10 is generally of an oblong shape. As the lever 10 is moved to the open position, the bifurcated ends 13*a*, 13*b* become more spaced apart because the cam surface of the lever 10 disengages the wear plate 17 so that the bolt 12 does not pull the bifurcated ends 13*a*, 13*b* together as tightly. The distal bifurcated end 13*a* is actually pushed away from its counterpart 13*b* as the lever 10 is opened because of the contact bifurcated end 13*a* has with the bolt 12. This allows the collar 14 to loosen and the seat post to be able to move within the collar 14.

In an alternative embodiment there is no thumb screw 22, rather the bolt 12 is threaded directly into bifurcated end 13*a*. In this embodiment, the lever 10 is pivotally mounted onto pin 11 which is combined with the bolt 12. As the lever 10 pivots around the bolt's 12 axis, the bifurcated end 13*a* is moved relative to its counterpart 13*b*. This has the same effect of changing the diameter of the collar 14 as in the thumb screw 22 embodiment, however in order to lock the quick release device in this embodiment, the proper collar 14 diameter must be achieved when the lever 10 is parallel with the receiving member 15 (hereinafter referred to as nose 15) so that the locking mechanism 20 can be inserted into the nose 15 properly.

Figure 4:
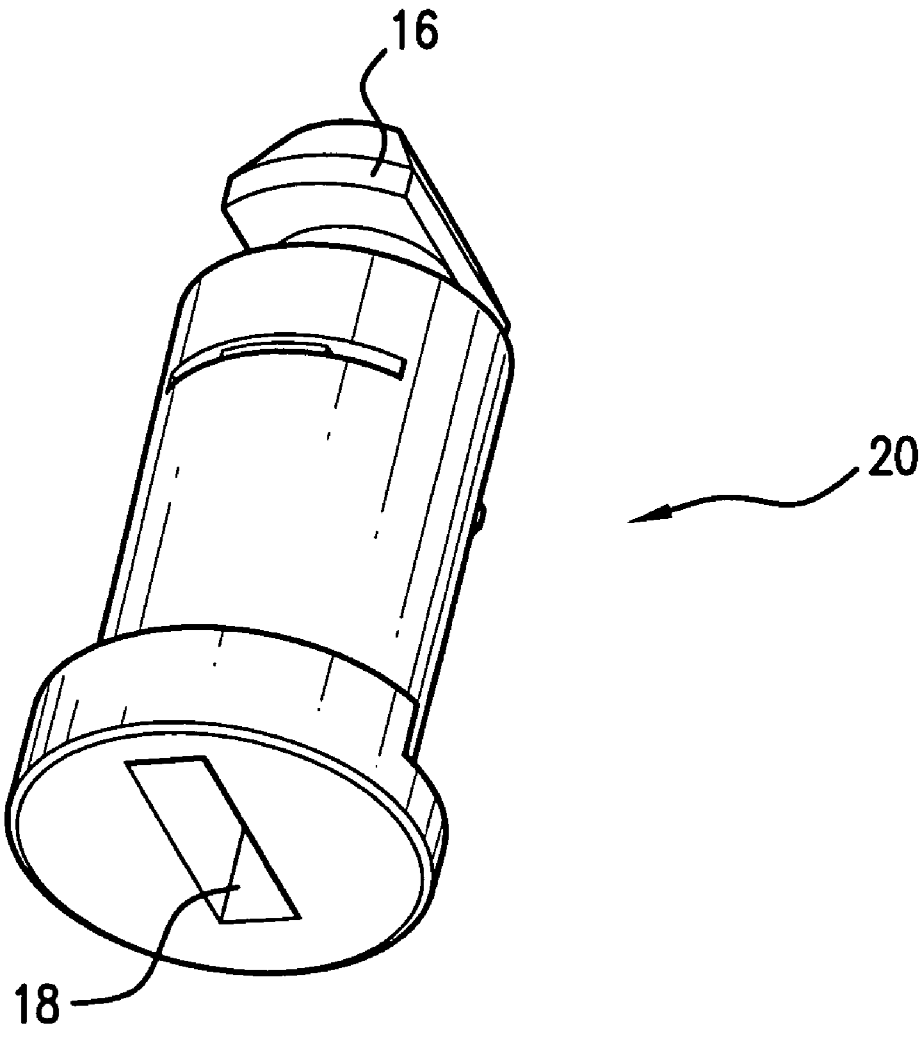
FIG. 4 is a perspective view of the locking mechanism.

After the bicycle rider adjusts the seat to its desired position using the quick release device in its open position, the lever 10 is closed toward the nose 15, which is an extension of the collar 14. The closed position is shown in FIG. 1. As the lever 10 closes, the cam surface on the lever 10 causes the bolt 12 to be pulled toward the lever 10. The bolt 12 is in contact with bifurcated end 13*a* through either the thumb screw 22 or because the bolt 12 is directly threaded into bifurcated end 13*a* (both embodiments are described above). Thus, as the bolt is pulled toward the lever 10, bifurcated end 13*a* is pulled toward bifurcated end 13*b*. This in turn tightens the collar 14 around the seat post, holding it in a secure position. In order to prevent unwanted opening of the lever 10, a standard locking mechanism 20, as shown in FIG. 4, is combined with the lever 10 to lock the lever 10 in the closed position. In the preferred embodiment the locking mechanism 20 is combined with the lever 10 so that the majority of the locking mechanism 20 is located inside of the lever 10. This increases security since the lock 20 and its components cannot be broken without first breaking the strong lever 10 of the quick release device. In an alternate embodiment, the locking mechanism 20 is combined with the nose 15, and the lever 10 comprises the locking pins 19 and receives the locking plate 16. The preferred embodiment comprises a standard plug lock such as that used in standard bicycle accessories. The locking mechanism 20 of the preferred embodiment is shown in FIG. 4, apart from the locking quick release device of the present invention. The locking mechanism 20 is shown cross-sectionally in FIGS. 5 and 6 as it is used in combination with the lever 10 of the locking quick release device.

Figure 5:
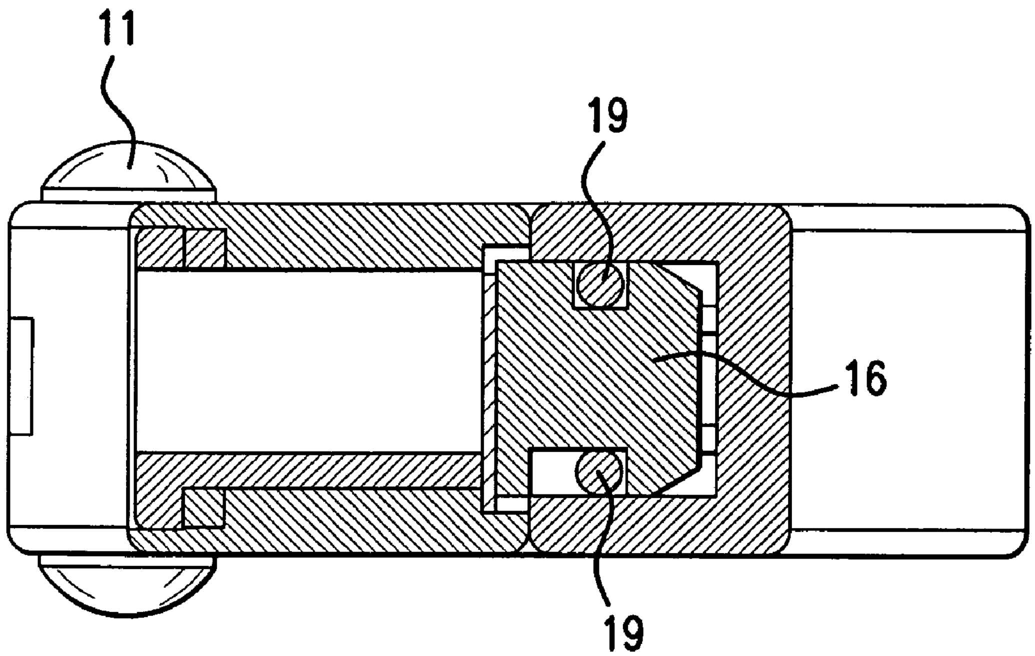
FIG. 5 is a side cross-sectional view showing how the locking mechanism fits inside of the device in a locked position.
Figure 6:
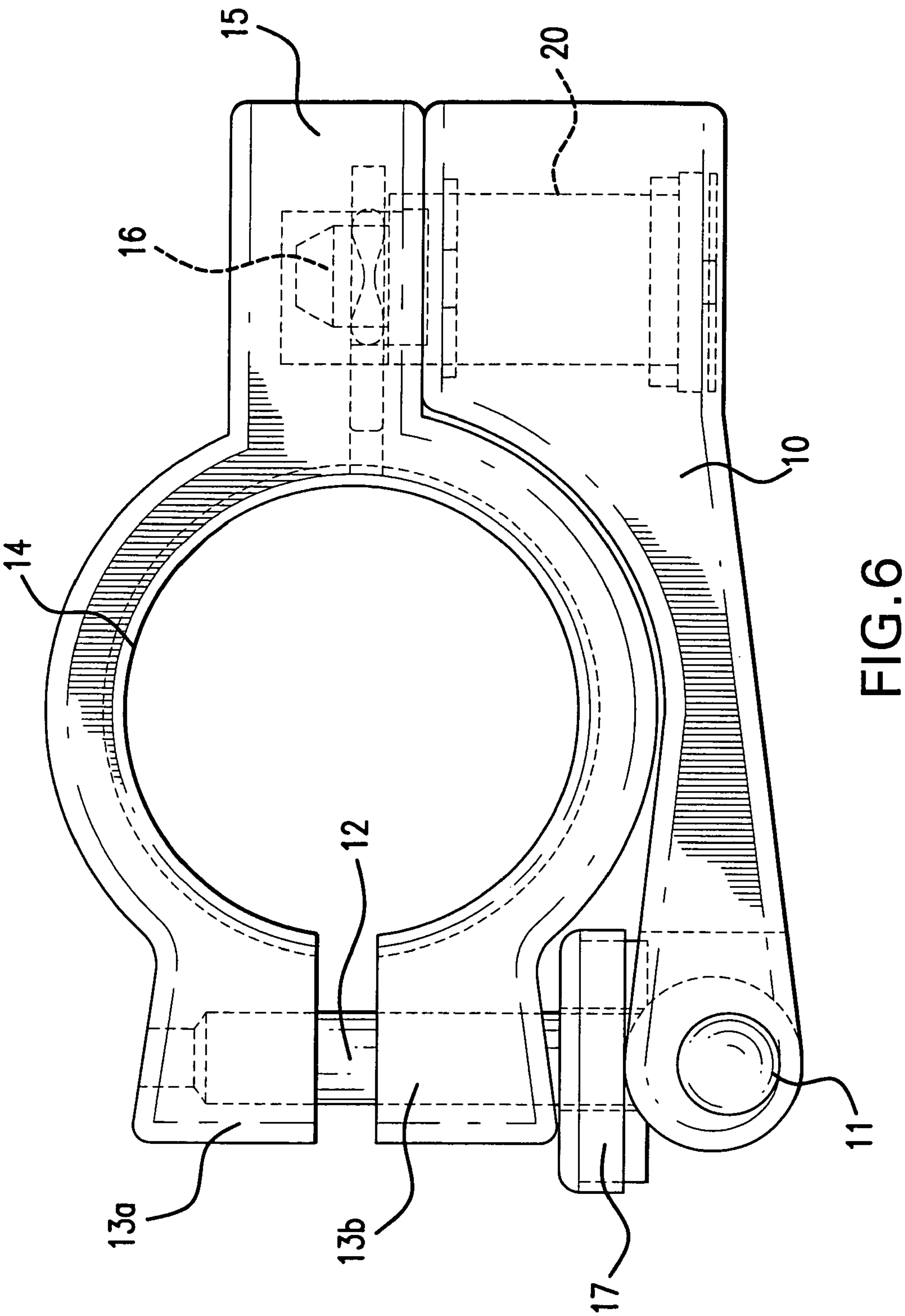
FIG. 6 is a top cross-sectional view showing how the locking mechanism fits inside of the device in a closed position.
Figure 7:
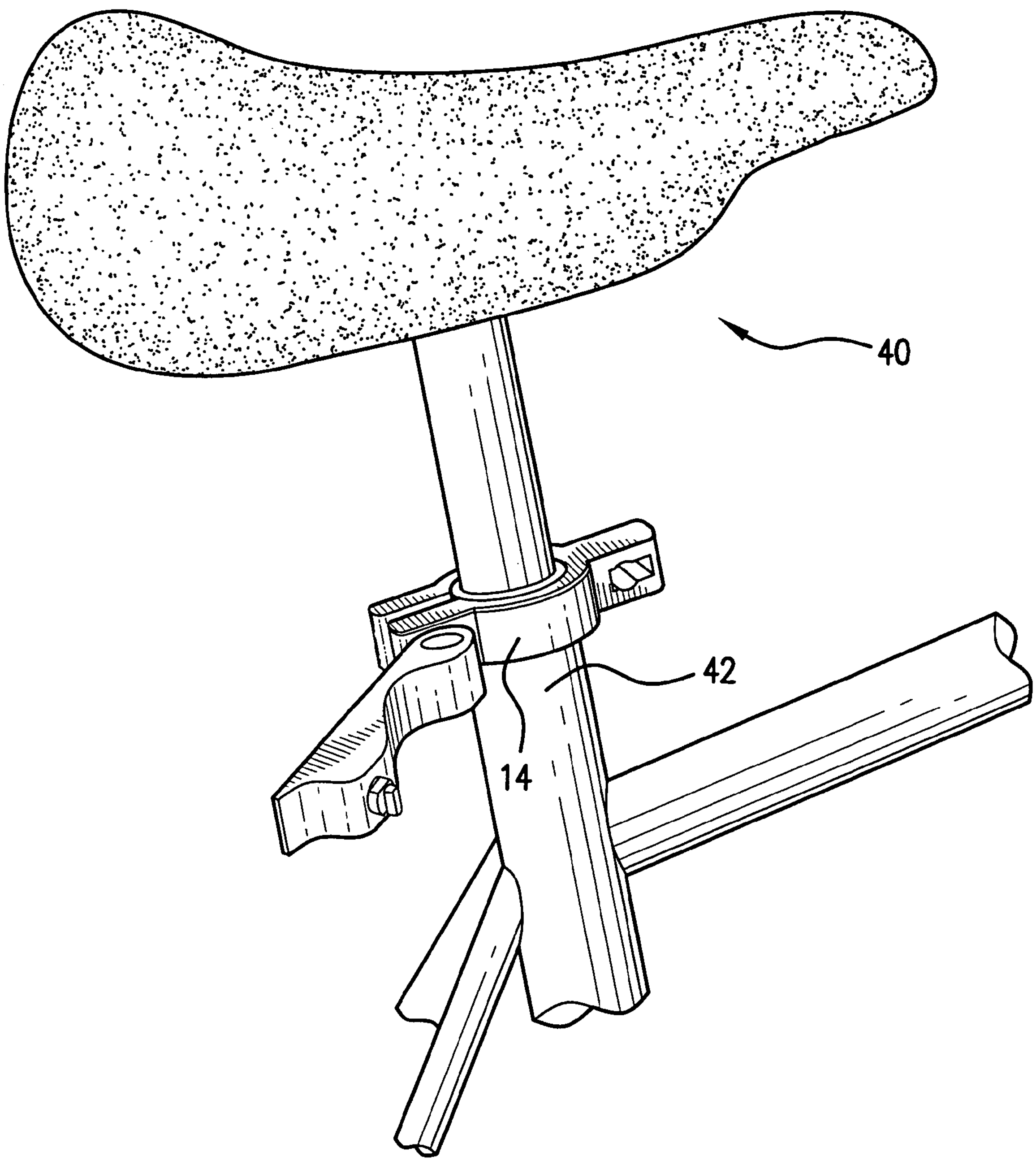
FIG. 7 is a perspective view showing the locking mechanism combined with the frame of a bicycle.

The figures show how the locking mechanism 20 comprises a key slot 18 and a latching mechanism such as a locking plate 16. When the lever 10 is in the closed position, the portion of the locking mechanism 20 that comprises the locking plate 16 is inserted into the nose 15 of the locking quick release device, as shown in FIGS. 5 and 6. This not only locks the device, but provides the additional benefit of keeping the lever 10 tucked away so that the rider does not rub against or otherwise injure his/her leg on the pointed end of the lever 10. When the proper key is inserted into the key slot 18, the key turns and the locking plate 16 is engaged. The engagement of the locking plate 16 means that it moves from a first position to a second position rotationally about an axis. The locking plate 16 can enter the nose 15 of the device in one position, and then when it becomes engaged, it cannot exit the nose 15 because its exit is blocked by a catch mechanism such as locking pins 19 inside of the nose 15, as shown in FIG. 5. The locking pins 19 are securely affixed to the inside of the nose 15. In this closed and locked position the collar 14 is secure around the seat post so that the seat cannot be adjusted or removed until the lever 10 is unlocked and moved to the open position.

This invention comprises a second preferred embodiment of the locking quick release device in which the device is used to lock a quick release mechanism used in combination with the wheels of a bicycle. This second embodiment is similar to the seat post embodiment in all substantive respects, except that generally with these types of quick release devices, the lever 10 is part of the removable component (the wheel). The lever 10 comprises a locking mechanism 20 which fits into a nose 15 to lock the lever 10 in the closed position. In this embodiment, it is not necessary that the nose 15 and lever 10 be combined in one piece. The nose 15 can be separately mounted onto the frame of the bicycle as long as the locking mechanism 20 combined with the lever 10 can insert into the nose 15. In the preferred usage of this invention, both the first and the second embodiments will be used on the same bicycle, and the locking mechanisms 20 will be keyed to the same key for convenience.

A third embodiment of the locking quick release device is similar to the above mentioned embodiments except that it is used on a bicycle trailer, car hauler, or other bicycle transportation device. Oftentimes devices for transporting bicycles on top of cars or in trailers or truck beds employ quick release devices. The front tire of the bicycle is removed and the fork of the bicycle is attached to a quick release device that is securely mounted onto the car, truck, or trailer. This allows the bicycle to be transported and locked in an upright position so that it does not get scratched or otherwise damaged. This third embodiment is similar to the second embodiment, except the locking quick release device locks the bicycle fork to the car top or trailer bed for transport when one or both of the wheels are removed.

Alternate methods for achieving the above preferred embodiments may include different means for locking the lever 10 to the nose 15. For example, the locking plate 16 may be replaced by a set of tumblers that lock the lever 10 to the nose 15 of the device.

In the sport of cycling there are many items used by the rider that employ standard locks. Some of these include U-locks (or other devices to lock the bicycle frame to a secure object), trailer locks, bike rack locks, and tool kits. One benefit of using a standard lock in all embodiments of the present invention is that a cyclist can have all of his/her bicycle locks keyed to the same lock so that he/she only has to carry one key.

It is sometimes not desirable to carry keys when bicycling. Therefore, the locking mechanism in the present invention can also be a combination lock, which does not require a key. Combination locks are well known and would simply require the rider to remember a few numbers in combination to open the lock and adjust or remove the seat and/or wheels of the locking quick release device.

The preferred material of construction of all embodiments of the present invention is a strong yet light weight material that will not break when large amounts of pressure is applied. Materials such as stainless steel, titanium, or an aluminum alloy are preferred.

Having thus described the invention in connection with the preferred embodiments thereof, it will be evident to those skilled in the art that various revisions can be made to the preferred embodiments described herein with out departing from the sprit and scope of the invention. It is my intention, however, that all such revisions and modifications that are evident to those skilled in the art will be included with in the scope of the following claims.

What is claimed is:

1. A locking quick release device for lockingly affixing a bicycle seat assembly to a fixed component, the fixed component having a first member and a second member moveable toward and away from each other between a first position in which the bicycle seat assembly is affixed to the fixed component and a second position is which the bicycle seat assembly is removable from the fixed component, said locking quick release device comprising:

a lever having a handle end and a pivot end, the lever being movable about the pivot end between an open position and a closed position so that movement of the lever to the closed position causes the members to move to the first position and movement of the lever to the open position causes the members to move to the second position;

a locking mechanism operatively combined with the handle end of the lever to selectively prevent movement of the lever about its pivot end when the locking mechanism is actuated into a locked position, wherein the locking mechanism has a latching mechanism;

a receiving member is combined with the fixed component for receiving the latching mechanism to provide for locking of the lever to the fixed component and thereby prevent removal of the bicycle seat assembly from the fixed component when the locking mechanism is actuated into a locked position;

wherein the lever further comprises a cam surface near the lever pivot end so that movement of the lever to the closed position moves the first and second members to the first position in which they are closer together, and movement of the lever to the open position moves the first and second members to the second position in which they are farther apart;

wherein the first and second members are combined with a collar adapted to receive the bicycle seat assembly, the diameter of the collar becoming smaller as the lever is moved to the closed position; and wherein the receiving member extends from the collar in a first direction, and the first and second members extend from the collar in the opposite direction.

2. The locking quick release device of claim 1 wherein the locking mechanism has a first end and a second end with a key slot at the second end, said key slot being adapted to receive a key.

3. The locking quick release device of claim 2 wherein the latching mechanism is turnable between a first and a second position when the key is inserted into and engaged within the key slot.

4. The locking quick release device of claim 3 wherein the receiving member comprises a catch mechanism that prevents the lever from moving to the open position when the latching mechanism is engaged in its second position and the lever is in the closed position.

5. The locking quick release device of claim 4 wherein the catch mechanism is comprised of locking pins.

* * * * *